United States Patent [19]
Nelson et al.

[11] Patent Number: 5,964,981
[45] Date of Patent: Oct. 12, 1999

[54] APPARATUS FOR LINING TUBULARS

[75] Inventors: John M. Nelson, Houston; William L. Snider, Sugar Land; Gary W. Bogema, Danbury; David V. Person, Sugar Land, all of Tex.

[73] Assignee: Tuboscope Vetco International, Inc., Houston, Tex.

[21] Appl. No.: 08/992,677

[22] Filed: Dec. 17, 1997

[51] Int. Cl.⁶ .................................................. B29C 63/34
[52] U.S. Cl. ..................... 156/423; 156/287; 156/294; 138/97; 138/98; 264/269; 264/516
[58] Field of Search .................................... 156/287, 294, 156/423; 264/269, 516; 138/97, 98; 118/105, 306, DIG. 10; 427/230, 236; 405/150.1, 150.2, 146

[56] References Cited

U.S. PATENT DOCUMENTS

| | | |
|---|---|---|
| 3,482,007 | 12/1969 | Routh . |
| 3,593,391 | 7/1971 | Routh . |
| 4,321,740 | 3/1982 | Davis et al. . |
| 4,401,696 | 8/1983 | Wood . |
| 4,865,673 | 9/1989 | Shishkin et al. . |

FOREIGN PATENT DOCUMENTS

| | | |
|---|---|---|
| 0082212 | 6/1983 | European Pat. Off. . |
| 6082-216 | 7/1981 | Japan . |

*Primary Examiner*—Sam Chuan Yao
*Attorney, Agent, or Firm*—Finnegan, Henderson, Farabow, Garrett & Dunner, L.L.P.

[57] ABSTRACT

A lined tubular assembly and a method and apparatus for lining an elongated tubular article to form the assembly. The lined tubular assembly has a metal tube with a non-metallic liner bonded to the internal surface thereof by a bonding agent. A non-metallic flanged end piece is secured to each end of the metal tube and has a first portion extending into the tube between the liner and the internal surface of the tube and a second portion covering the end surface of the tube. The method for producing the assembly includes introducing simultaneously into the tubular article both a tubular liner and a bonding agent for bonding the liner to the internal surface of the tubular article. The apparatus for producing the assembly includes an elongated liner installation device that simultaneously introduces the liner and bonding agent to the interior of the tubular article.

15 Claims, 11 Drawing Sheets

APPARATUS FOR LINING TUBULARS

BACKGROUND OF THE INVENTION

1. Field of the Invention

The invention relates to lined tubular assembly and to a method and apparatus for lining elongated tubular articles with a non-metallic tubular liner bonded to the interior surface of the tubular article.

2. Brief Description of the Prior Art

It is well known to line metallic tubulars with a non-metallic liner, such as a plastic liner, bonded to the interior of the metallic tubular. This protects the metallic tubular from corrosion resulting from corrosive media passing through the tubular.

With conventional lined tubular products of this type, and methods and apparatus used for production thereof, there are significant problems. Specifically, there is a potential for voids and porosity to exist in the medium used to fill the annular space between the liner and the metal tubular. In addition, the lack of bonding between the annular filler medium and the liner and the metal tube lead to the likelihood of liner movement when the tube is placed in tension or in the presence of pressure buildup due to gas permeation at the interface of either the liner and the filler medium or the filler medium and the internal tubing surface. In addition, the filler medium used in conventional systems offers limited chemical resistance to the environmental conditions encountered in conventional corrosive applications. In this regard, conventional filler mediums offer limited barrier properties with respect to gas and liquid permeation and migration between the liner and the metal tubular.

With respect to the production practices for these lined tubulars, the techniques conventionally employed generally result in poor quality and poor product consistency, which ultimately result in reduced product performance.

Upon application of the non-metallic liner within the tubular, the end flanges conventionally used to protect the tubing ends and provide for sealing of the interfaces of the metal tubular, filler medium, and non-metallic liner are susceptible to damage and possible removal by items passing through the lined tubular. Likewise, the end flanges are susceptible to mechanical damage caused by impact during transport and installation thereof.

OBJECTS OF THE INVENTION

It is accordingly an object of the present invention to provide a method and apparatus for installing and bonding non-metallic liners to the interior of metallic tubulars that overcome the above-described problems of prior art systems.

An additional object of the invention is to provide for installation of liners in this application that are readily installed, positioned, and bonded to the metallic tubular interior in an efficient and consistent manner to result in improved product consistency and quality over prior art practices.

SUMMARY OF THE INVENTION

In accordance with the invention, an apparatus is provided for lining an elongated tubular article. The apparatus includes means for supporting a tubular liner for lining an interior of an elongated tubular article and means for simultaneously introducing to said interior the liner and a bonding agent for bonding this liner to the interior of the elongated tubular article. The apparatus may further include an elongated liner installation device having an outside diameter less than the inside diameter of the elongated tubular article. This device further includes a longitudinal cavity extending from a rearward end of the device to a forward end of the device and terminating at a bonding agent spreader component for applying and spreading a bonding agent onto an interior surface of the elongated tubular article during insertion of the liner installation device into and through the article. A liner-support portion is provided on the device intermediate the rearward and forward ends of the liner installation device. The liner-support portion supports a tubular liner for lining the elongated tubular article. The tubular liner has an outside diameter less than the inside diameter of the elongated tubular article. Means are provided for delivering the bonding agent to the spreader component during the insertion of the liner installation device into and through the elongated tubular article.

The liner-support portion of the liner installation device may have a circumferential relieved portion onto which the liner is supported.

The means for delivering the bonding agent may include a source of the bonding agent positioned exterior of the tubular article and the liner installation device. In addition, the means for delivering the bonding agent may further include at least one conduit extending from the source and through the liner installation device. The conduit may extend from the source through the liner installation device and into communication with a chamber in the liner installation device having an end portion opening into the spreader component of the device. The chamber may include means for mixing the bonding agent within the chamber prior to introducing the bonding agent to the spreader component. The source of the bonding agent may include means for metering a plurality of components of the bonding agent through separate conduits for each of the components and into the chamber for mixing.

The spreader component may include a bullet shaped end portion and a plurality of bonding agent outlets spaced around a circumferential portion of the spreader component. Alternately, the spreader component may include a spinning spray head for spraying the bonding agent onto the interior surface of the elongated tubular article The bonding agent outlets of the spreader component may be oriented at a reverse angle from the forward end of the device. This reverse angle may be within the range of zero degrees, which is perpendicular to the longitudinal axis of the elongated installation device, to forty-five degrees with respect to the longitudinal axis. The reverse angle may be approximately 26°. The bonding agent outlets may have the exterior ends thereof connected to transverse spreader grooves formed in a surface portion of the spreader component; these grooves are oriented transverse to the longitudinal axis of the device. These grooves may be at an angle of zero to 75° relative to the longitudinal axis of the device, preferably approximately 45°.

The spreader component may include a wiper, centralizer plate connected to the forward end of the spreader component for centralizing the spreader component within the tubular article and for decreasing movement of the bonding agent in a direction forward of the spreader component. This wiper, centralizer plate may be disk shaped.

In accordance with the method of the invention, the tubular article may be provided with a lining by introducing simultaneously into the article both a tubular liner for lining the article, with the tubular article having an outside diameter less than the inside diameter of the elongated tubular article, and a bonding agent for bonding the tubular liner to the elongated tubular article. The tubular liner and the bonding agent may be introduced simultaneously by mounting the tubular liner on an exterior portion of an elongated liner installation device and introducing the bonding agent through a longitudinal cavity of the installation device and into the elongated tubular article, while inserting the elongated liner installation device into and through the elongated tubular article to position and bond the liner to the tubular article.

A lined tubular article in accordance with the invention, includes a non-metallic tubular liner bonded to an internal surface of a metal tube by an organic bonding agent positioned between the internal surface of the metal tube and an external surface of a non-metallic tubular liner. The non-metallic tubular liner extends to both ends of the metal tube. This provides the tube with a continuous, uniform internal surface from end-to-end. A non-metallic flanged end piece is secured to each end of the metal tube. The flange end piece has a first portion extending into the metal tube and between the tubular liner and an internal surface end portion of the tube. A second portion of the flanged end piece covers the end surface of the metal tube.

DETAILED DESCRIPTION OF THE PREFERRED EMBODIMENTS

With respect to the drawings, and to the present to FIGS. 1 through 6 thereof, there is shown an embodiment of apparatus for installing a non-metallic liner in a metallic tubular article along with a bonding agent bonding the liner to the article.

Figure 1:
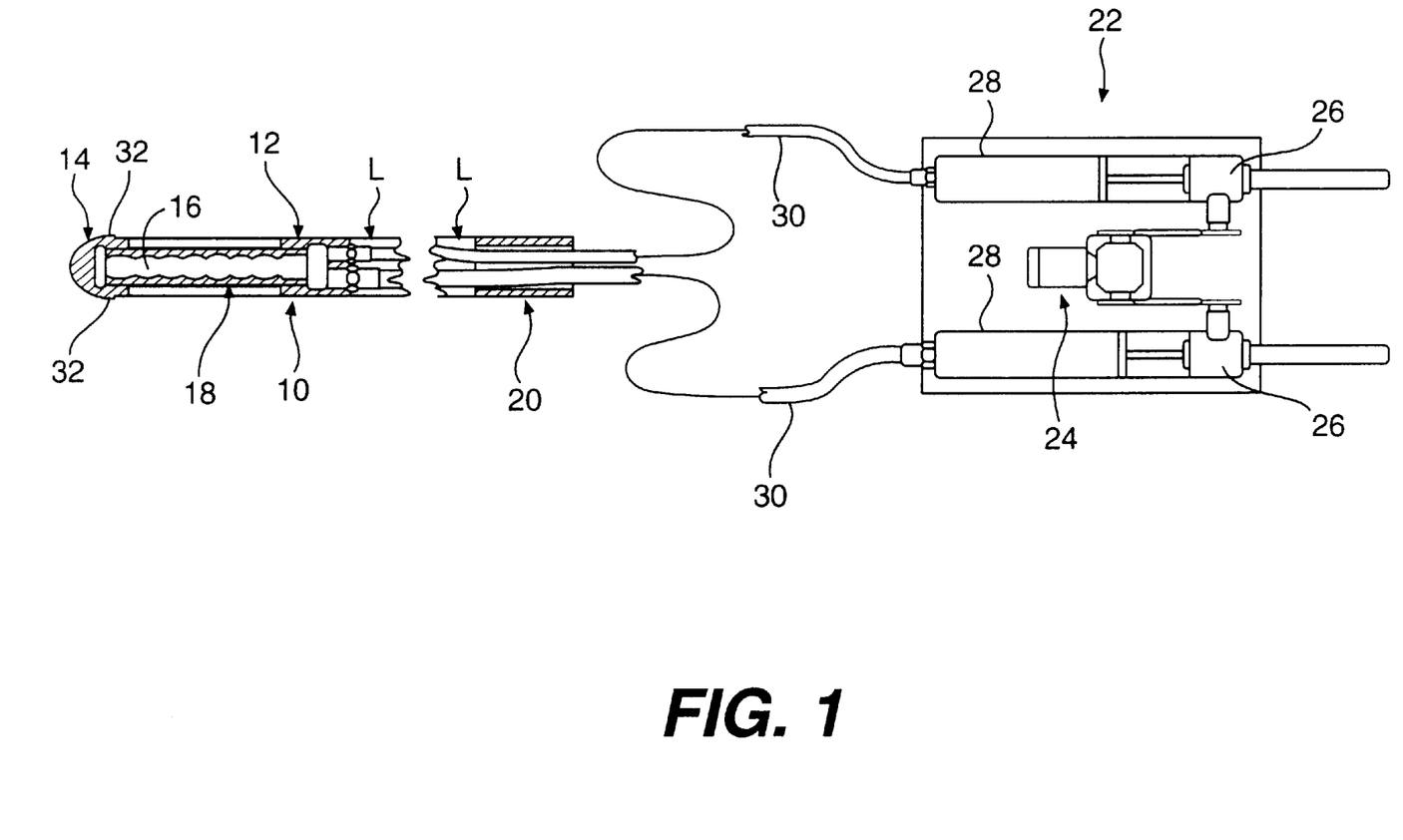
FIG. 1 is an assembly view in cross-section of one embodiment of apparatus for lining an elongated tubular article in accordance with the invention.

An elongated liner installation device, designated generally as 10, includes an adapter block 12 and a spreader block 14 with an elongated mixing chamber 16 between the spreader block and the adapter block. The mixing chamber 16 is provided with a static-type mixer 18. Rearward of the adapter block 12 is a stabbing/pushing block 20.

A bonding agent source and delivery device, designated generally as 22, is provided exterior of the liner installation device 10. The delivery device 22 includes an electric motor 24 drivingly engaging a pair of screw jacks 26. The screw jacks 26 may be adjusted to meter components of the bonding agent contained within a pair of coating cylinders 28. Alternatively, an air-driven proportioned delivery device could be used. Conduits 30 extend from each of the coating cylinders 28 through the stabbing/pushing block 20 and into communication with the mixing chamber 16.

In operation of the device 22, the motor 24 drives the screw jacks 26 with the coating component proportions being metered by selected drive ratios to provide the selected mixture ratio to the mixing chamber 16. These components are mixed in the mixing chamber 16 by the mixer 18 for spreading onto the interior surface of the metal tubular by spreader block 14 via outlets 32 provided through the spreader block.

Figure 4A:
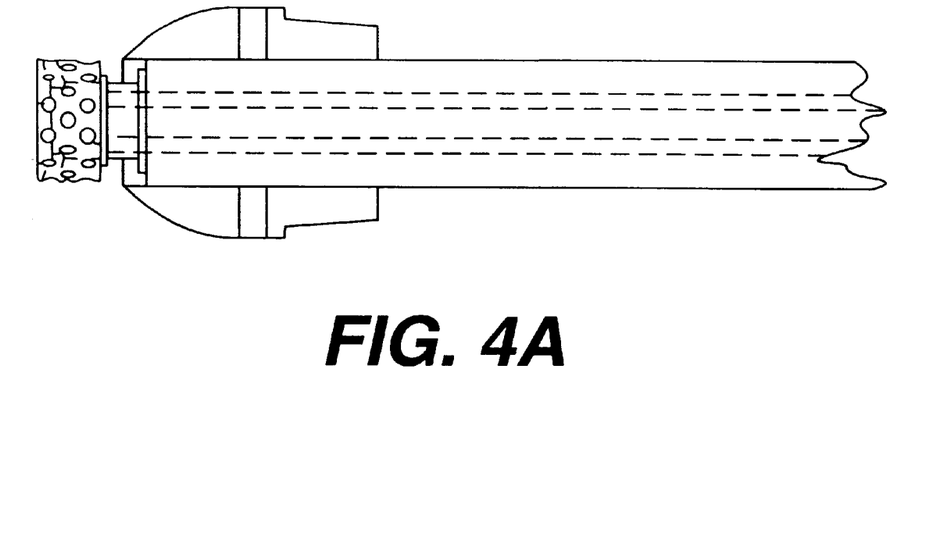
FIGS. 4A–4E comprise detailed views of a spreader block component and alternate spinning spray head component of the device of FIGS. 1, 2, and 3.
Figure 4B:
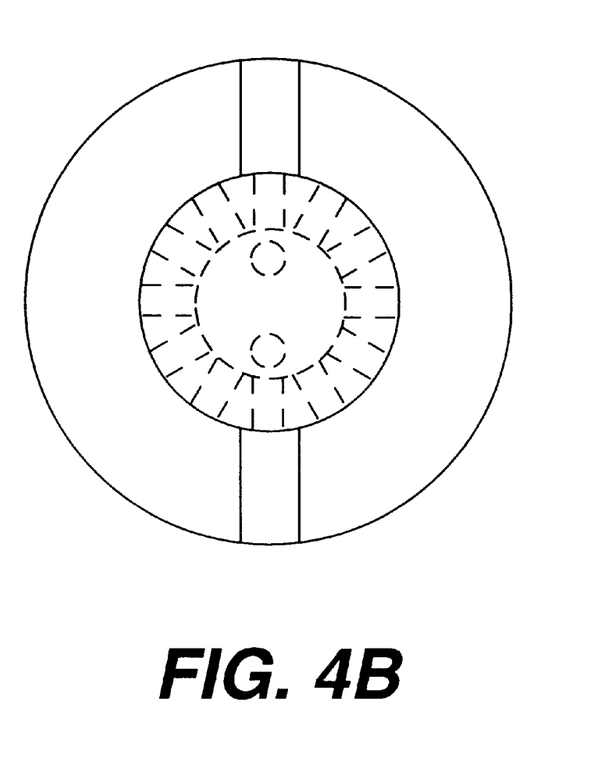
Figure 4C:
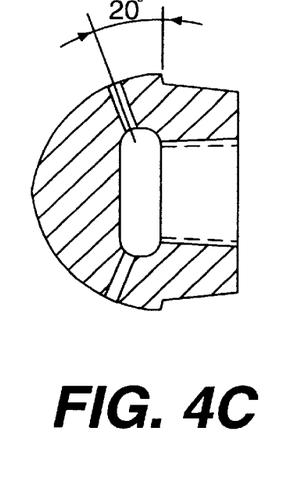
Figure 4D:
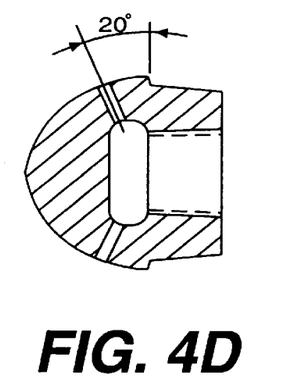
Figure 4E:
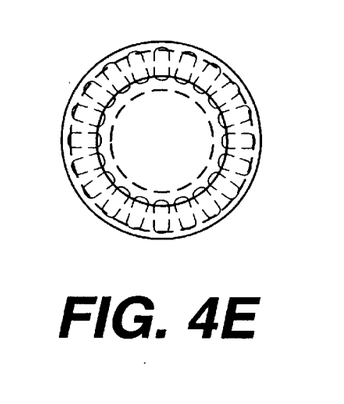
Figure 5A:
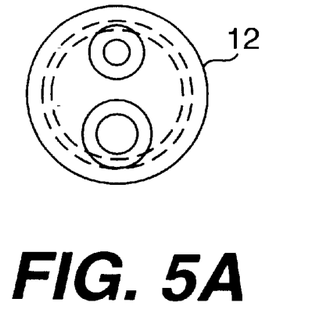
FIGS. 5A–5D comprise additional detailed showings of adapter block and stabbing/pusher block components of the assembly of FIG. 1.
Figure 5B:
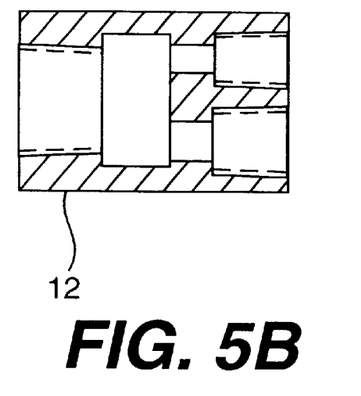
Figure 5C:
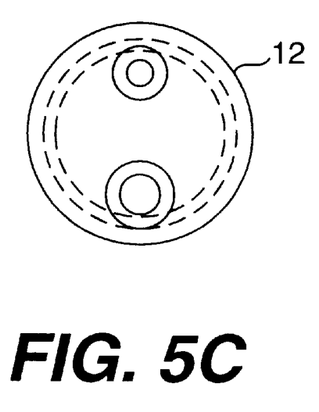
Figure 5D:
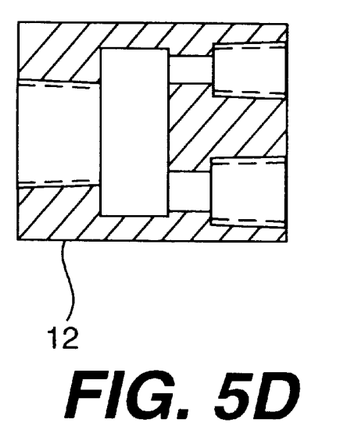
Figure 6:
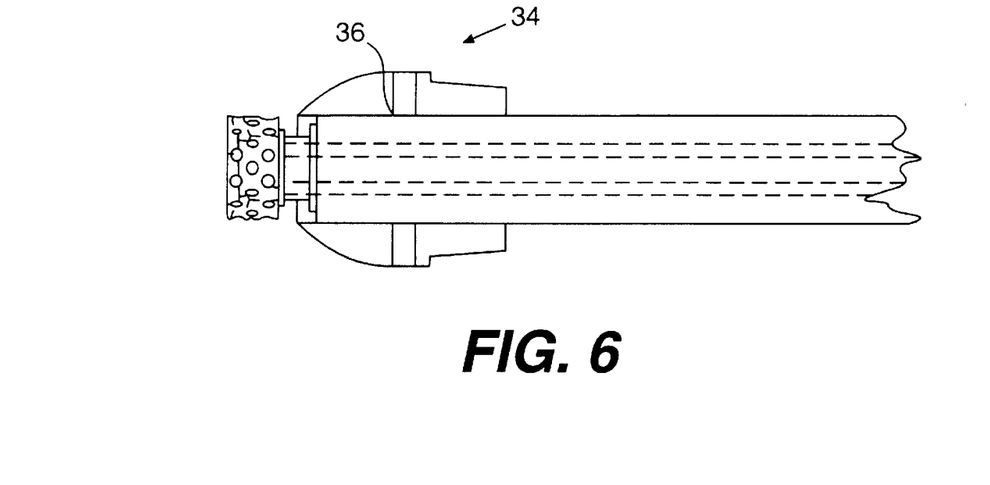
FIG. 6 is a detailed assembly view in cross-section of the alternate opening spray head component of FIG. 4.

Alternately, as shown in FIGS. 4A, 4B, and 6, a spinning spray head 34 may be substituted for the spreader block 14. The spinning spray head rotates to deposit bonding agent through openings 36 in the spray head onto the interior surface of the tubing from the mixing chamber 16.

Figure 9A:
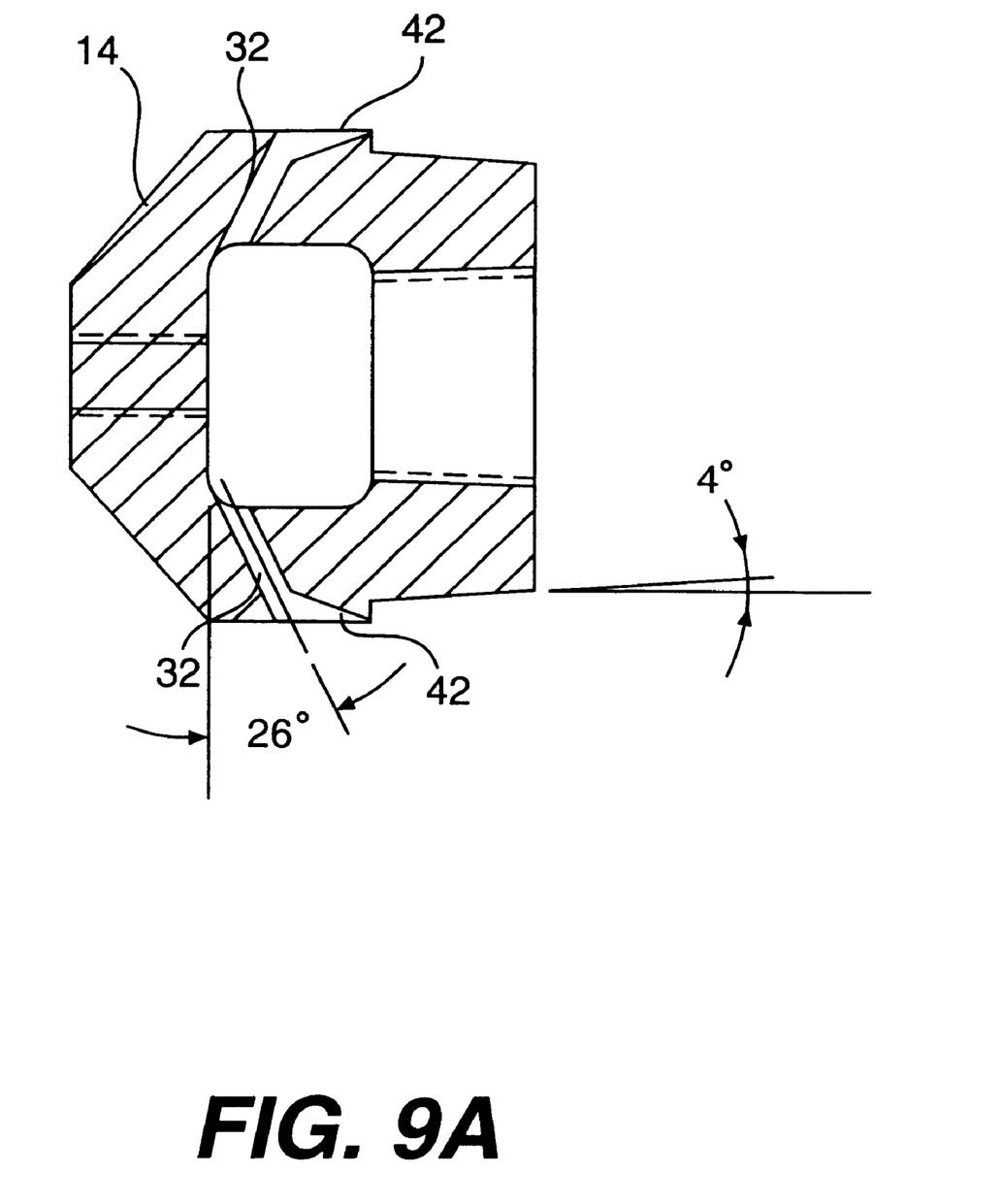
FIGS. 9A–9C comprise detailed views of a preferred embodiment of a spreader block component.
Figure 9B:
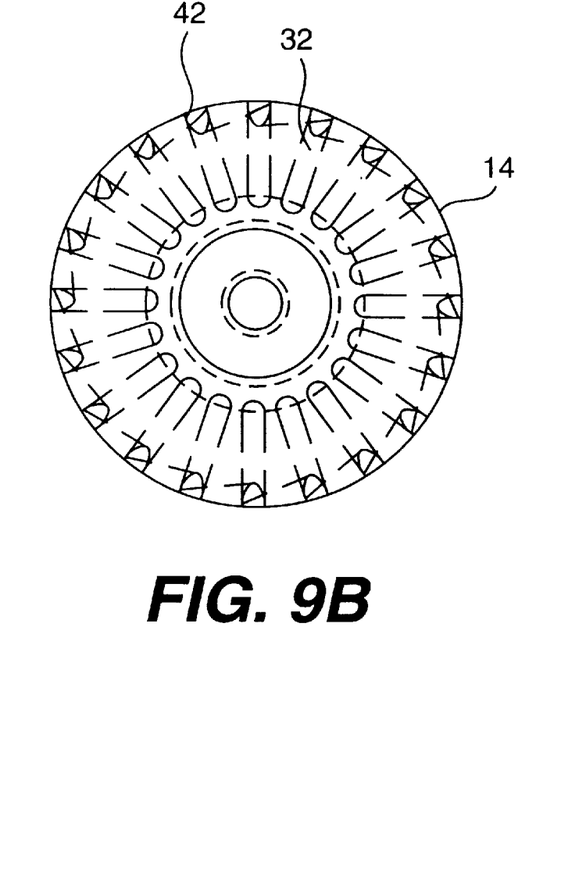
Figure 9C:
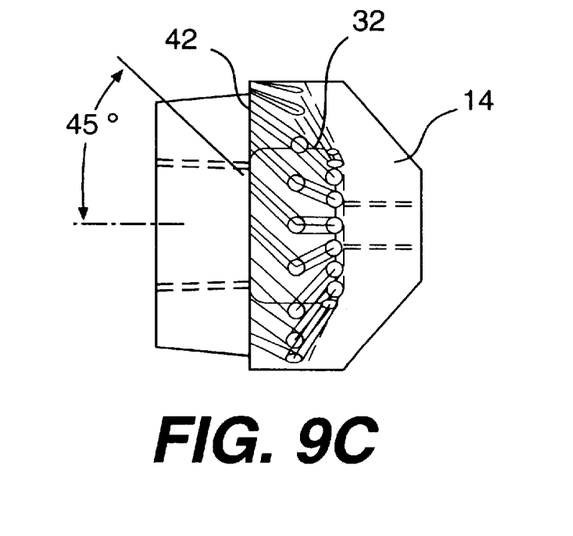

In a preferred embodiment of the spreader block, as shown in FIGS. 9A, B and C, the spreader block 14 is provided with outlets 32 that are oriented at a reverse angle from the forward end of the spreader block. The outlets 32 are connected at exterior ends thereof to transverse spreader grooves 42 formed in the surface of the spreader block. These grooves are oriented transverse to the longitudinal axis of the device.

Figure 10A:
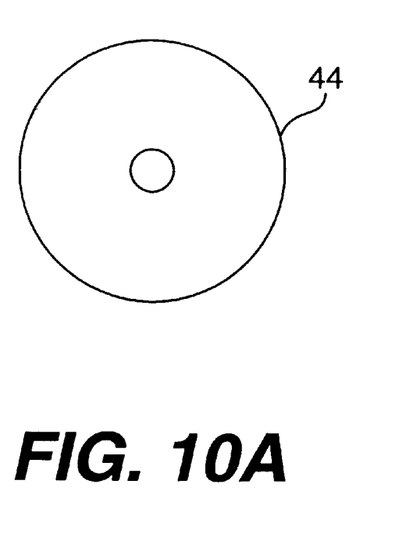
FIGS. 10A–10B comprise detailed views of the wiper, centralizer plate.
Figure 10B:
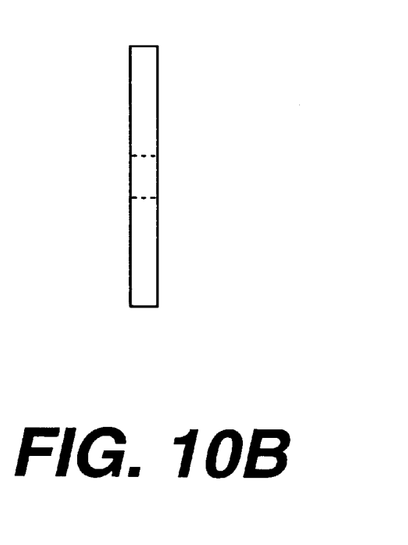
Figure 11:
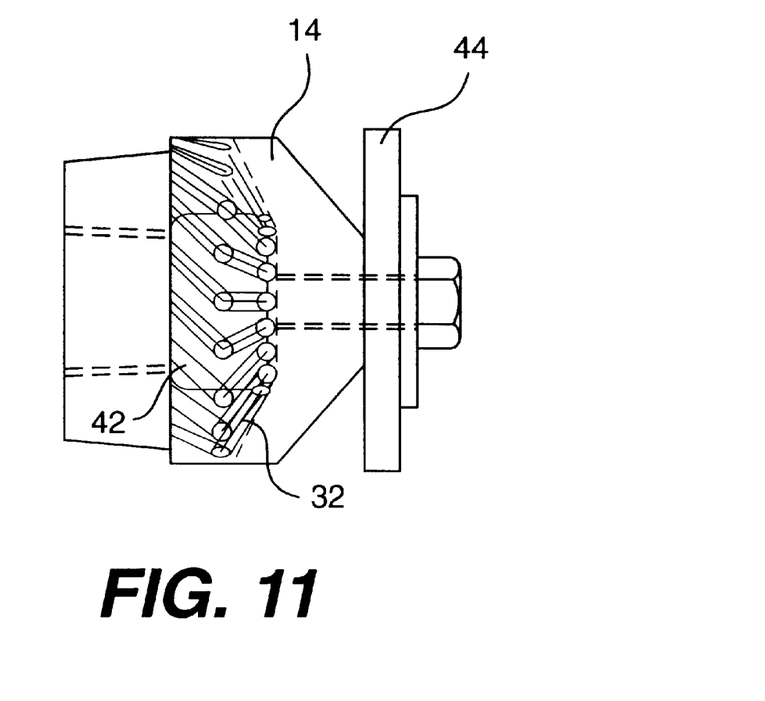
FIG. 11 is a detailed assembly view of the spreader block component of FIG. 9 and the wiper, centralizer plate of FIG. 10.

As shown in FIGS. 10A and B, a wiper, centralizer plate 44 of disk-shaped configuration is provided for connection to the forward end of the spreader block as shown in FIG. 11.

The reverse angle of the outlets 32 as shown in FIGS. 9 facilitate the spreading of the bonding agent between the liner and the metal tubing by drawing the bonding agent under the liner during insertion of the installation device 10 into the tubing. The grooves 42 further facilitate this action with respect to the spreading of the bonding agent. The wiper, centralizer plate 44 in association with the spreader block configuration, as shown in FIG. 11, provides for improved centralization of the spreader component by supporting it centrally within the metal tubing during insertion of the installation device into the tubing. In addition, the plate 44 serves to impede movement of the bonding agent in a forward direction related to the spreader component during insertion of the installation device into the tubing.

The bonding agent may be an organic medium of a two-component system. Alternate organic or inorganic mediums may include single or multi-component systems. The material will provide an adhesive and/or chemical bond with respect to the liner and the metallic tube. This will minimize liner movement when the tube is placed in tension and gas permeation between the various layers making up the assembly.

Figure 2:
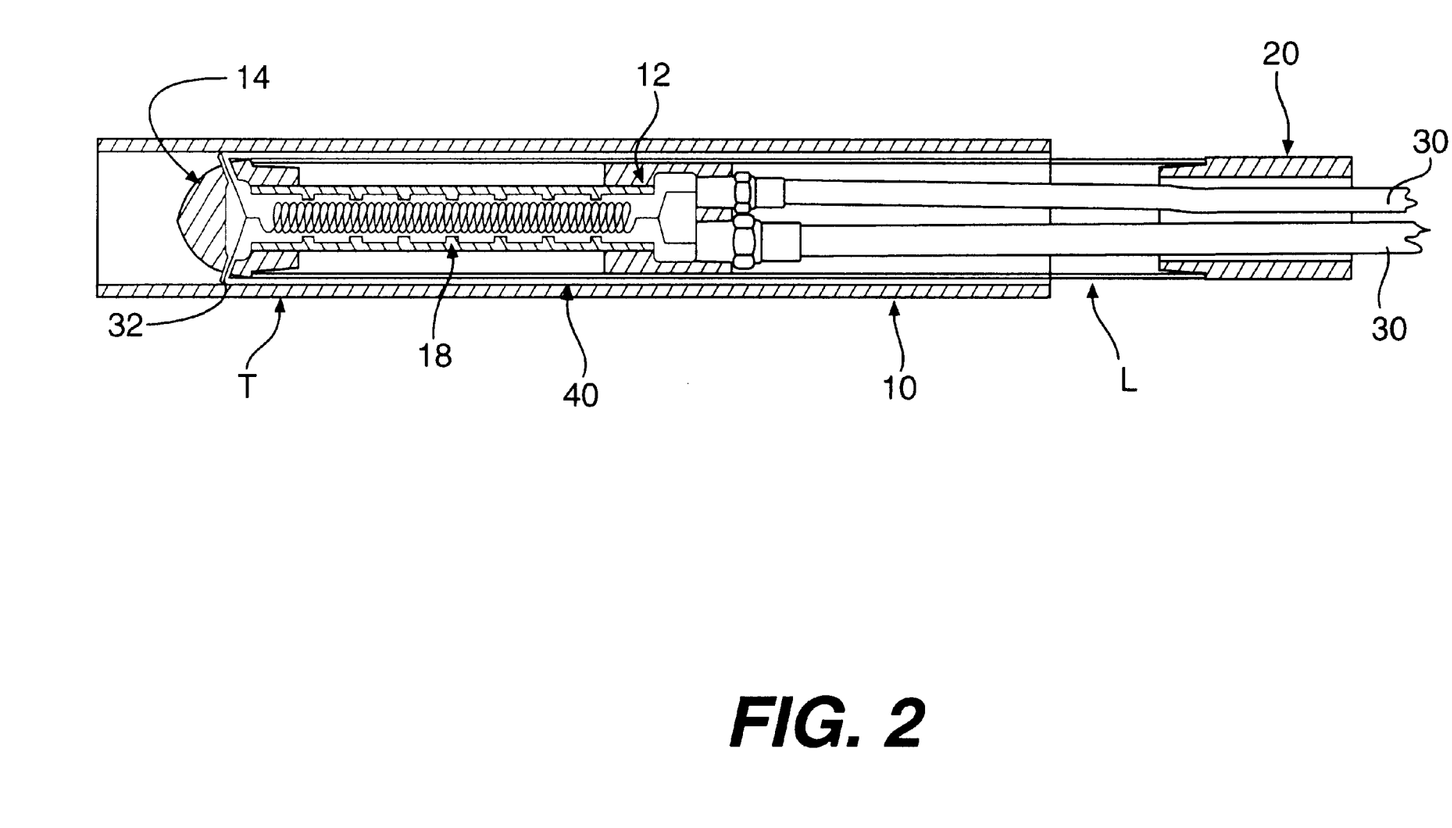
FIG. 2 is a more detailed assembly view in cross-section of a component of the apparatus of FIG. 1.
Figure 3:
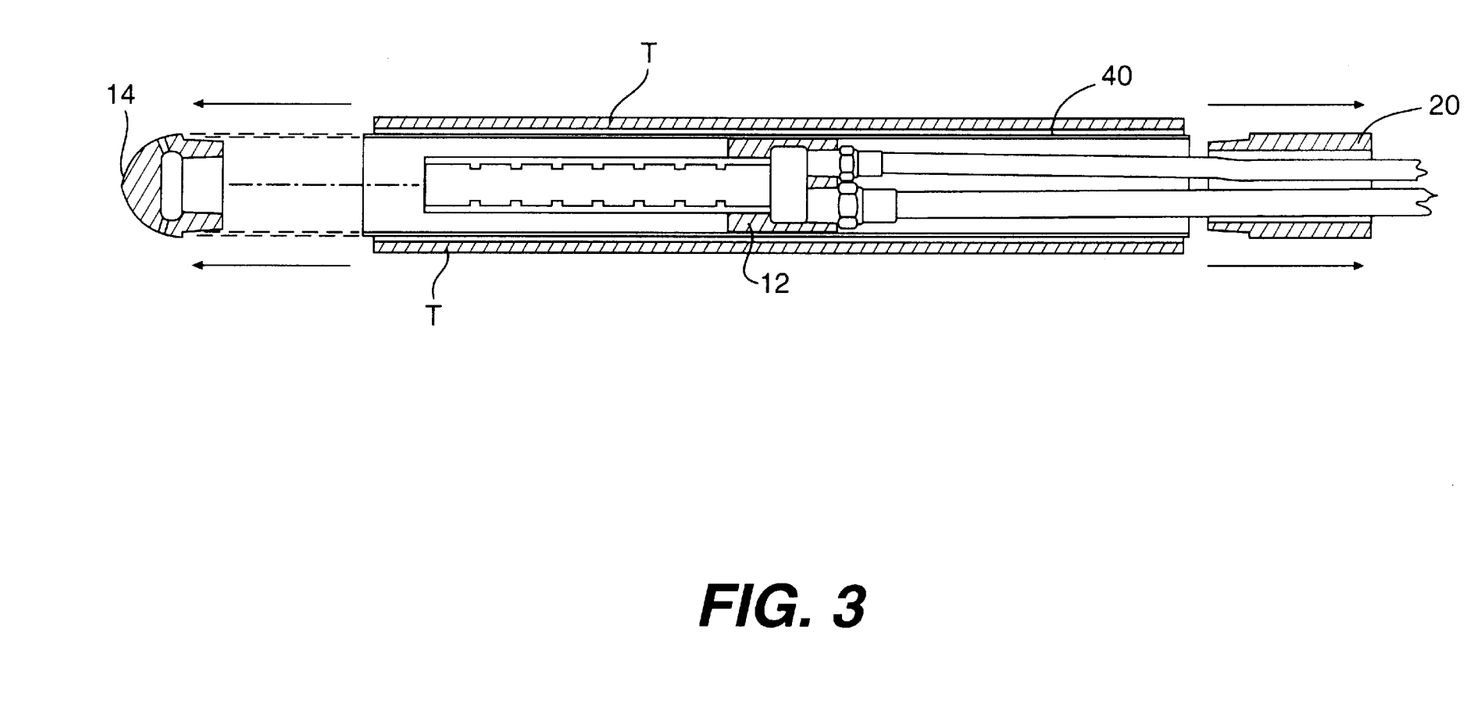
FIG. 3 is an exploded view in cross-section of the component of FIG. 2.
Figure 7:
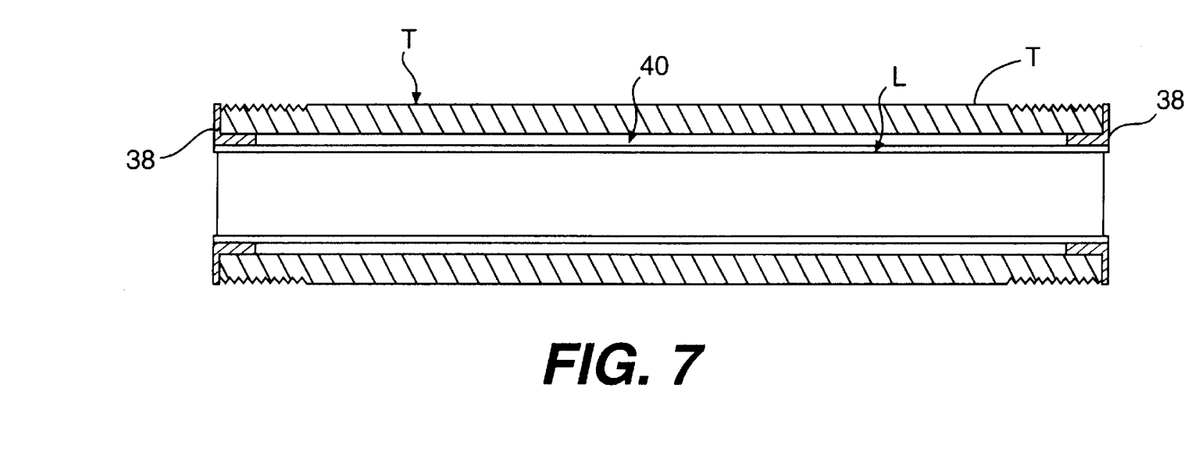
FIG. 7 is a cross sectional view of an assembly in accordance with the invention that includes a metal tube having a non-metallic liner bonded to the interior thereof, with non-metallic flanged end pieces positioned on both ends of the metal tube.
Figure 8A:
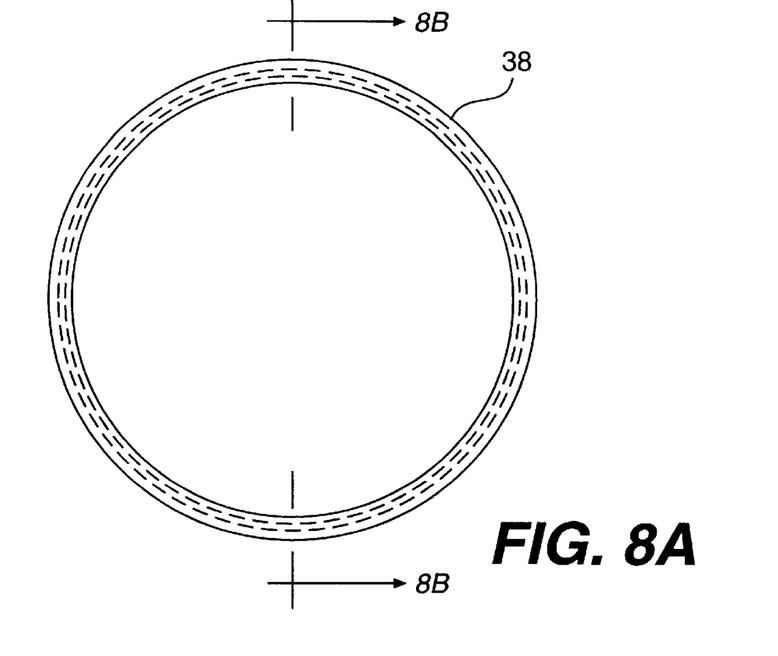
FIGS. 8A–8B are a detailed view of a flanged end piece component of the assembly of FIG. 7.
Figure 8B:
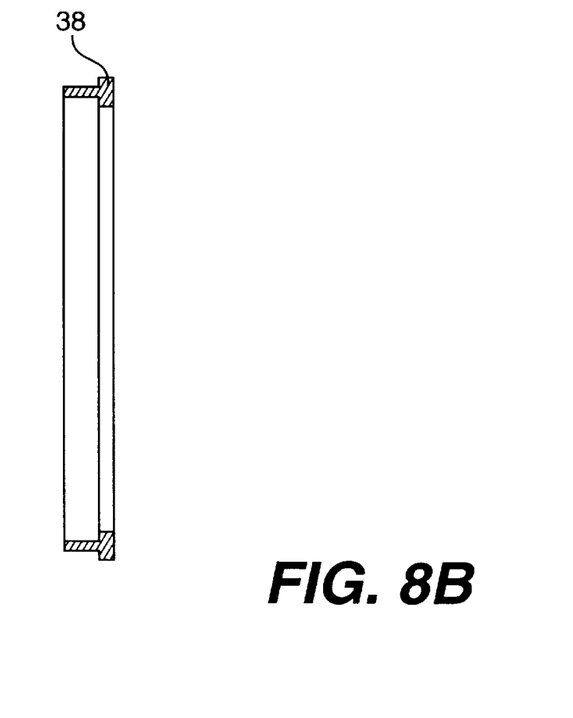

The liner, designated as L, is installed by mounting the liner on the installation device 10 as shown in FIGS. 2 and 3. The liner, as shown in FIG. 2, is supported at each end by the spreader block 14 and the stabilizing/pushing block 20. The installation device provides for insertion of the liner as the metal tubing is held stationary or rotated at a controlled rate of speed while the spreader block 14 or spinning spray head 34 mixes and applies the organic material 40 adjacent the leading edge of the liner being inserted. The organic medium is applied in a 360° pattern and evenly distributed to fill the annular space by either the spreader block or the spinning spray head. After the liner is inserted, the organic medium is allowed to partially cure. As shown in FIG. 3, then the spreader block 14 (or spinning spray head 34) is removed and the installation device is removed from the tubing T. The liner is then trimmed to proper length and end flanges 38, as shown in FIGS. 7 and 8, are installed on the ends of the tubing T. The end flanges 38 are held in place by the bonding agent. To insure that sufficient bonding agent is provided, manual application of additional bonding agent may be applied to the insertion end of the tubing during installation.

What is claimed is:

1. Apparatus for lining an elongated tubular article, comprising an elongated liner installation device having an outside diameter less than an inside diameter of said elongated tubular article and comprising a longitudinal cavity extending from a rearward end of said device to a forward end of said device and terminating at a bonding agent spreader component for applying and spreading a bonding agent onto an interior surface of said elongated tubular article during insertion of said liner installation device into and through said elongated tubular article, a liner-support portion intermediate said rearward end and said forward end of said liner installation device for supporting a tubular liner for lining said elongated tubular article, with said tubular liner having an outside diameter less than said inside diameter of said elongated tubular article, and means for delivering said bonding agent to said spreader component during said insertion of said liner installation device into and through said elongated tubular article;

wherein said means for delivering bonding agent includes a source of said bonding agent positioned exterior of said tubular article and said liner installation device, and further includes at least one conduit extending from said source and through said liner installation device.

2. The apparatus of claim 1, wherein said liner-support portion of said liner installation device comprises a circumferential relieved portion at each end of said liner-support portion onto which said liner is supported.

3. The apparatus of claim 2, wherein said at least one conduit extends from said source, through said liner installation device, and into communication with a chamber thereof having an end portion opening into said spreader component.

4. The apparatus of claim 3, wherein said chamber of said liner installation device includes means for mixing said bonding agent therein prior to introduction of said bonding agent to said spreader component.

5. The apparatus of claim 4, wherein said source of said bonding agent includes means for metering a plurality of components of said bonding agent through separate conduits for each of said components and into said chamber for mixing.

6. The apparatus of claim 1, wherein said spreader component includes a bullet-shaped end and a plurality of bonding agent outlets spaced around a circumferential portion thereof.

7. The apparatus of claim 1, wherein said spreader component includes a spinning spray head for spraying said bonding agent.

8. The apparatus of claim 6, wherein said bonding agent outlets are oriented at a reverse angle from said forward end of said device.

9. The apparatus of claim 6, wherein an angle of said bonding agent outlets is within a range of zero degrees being perpendicular to a longitudinal axis of said apparatus to 45° with respect to said longitudinal axis in a reverse direction.

10. The apparatus of claim 9, wherein said reverse angle is approximately 26° with respect to said longitudinal axis.

11. The apparatus of claim 9, wherein said bonding agent outlets have exterior ends connected to transverse spreader grooves in a surface portion of said spreader component oriented transverse to a longitudinal axis of said apparatus.

12. The apparatus of claim 11, wherein said transverse spreader grooves are oriented transverse to said longitudinal axis of said apparatus at an angle within a range of zero to 75°.

13. The apparatus of claim 12, wherein said angle is approximately 45°.

14. The apparatus of claims 1 or 6, wherein said spreader component includes a wiper, centralizer plate connected to a forward end of said spreader component for centralizing the spreader component within said tubular article and for decreasing movement of said bonding agent in a direction forward of said spreader component.

15. The apparatus of claim 14, wherein said wiper, centralizer plate is disk shaped.

* * * * *

UNITED STATES PATENT AND TRADEMARK OFFICE
CERTIFICATE OF CORRECTION

PATENT NO.: 5,964,981

DATED: October 12, 1999

INVENTOR(S): John M. NELSON; William L. SNIDER; Gary W. BOGEMA; and David V. PERSON It is certified that an error appears in the above-identified patent and that said Letters Patent is hereby corrected as shown below:

IN THE CLAIMS:

Claim 3, col. 5, line 48, "claim 2" should read --claim 1--.

Claim 10, col. 6, line 28, "claim 9" should read --claim 9--.

Claim 11, col. 6, line 30, "claim 9" should read --claim 8--.

Signed and Sealed this

Eleventh Day of April, 2000

Attest:

Q. TODD DICKINSON

Attesting Officer

Director of Patents and Trademarks